United States Patent
Hamlin

[19]

[11] Patent Number: 5,961,585
[45] Date of Patent: Oct. 5, 1999

[54] REAL TIME ARCHITECTURE FOR COMPUTER SYSTEM

[75] Inventor: Christopher L. Hamlin, Cupertino, Calif.

[73] Assignee: Apple Computer, Inc., Cupertino, Calif.

[21] Appl. No.: 08/779,657

[22] Filed: Jan. 7, 1997

[51] Int. Cl.$^6$ .................................................. G06F 9/00
[52] U.S. Cl. ..................... 709/108; 710/260; 710/261; 710/262; 710/266
[58] Field of Search ............................ 709/100, 108; 710/266, 260, 269, 261, 262, 263, 264

[56] References Cited

U.S. PATENT DOCUMENTS

| | | | |
|---|---|---|---|
| 3,984,820 | 10/1976 | Stanley et al. ............................ | 395/738 |
| 5,247,675 | 9/1993 | Farrell et al. ............................ | 395/673 |
| 5,283,904 | 2/1994 | Carson et al. ............................ | 395/739 |
| 5,410,710 | 4/1995 | Sarangdhar et al. ..................... | 395/739 |
| 5,495,615 | 2/1996 | Nizar et al. .............................. | 395/733 |
| 5,515,538 | 5/1996 | Kleiman ................................... | 395/733 |
| 5,555,420 | 9/1996 | Sarangdhar et al. ..................... | 395/739 |

*Primary Examiner*—Majid A. Banankhah
*Attorney, Agent, or Firm*—Mark A. Aaker

[57] ABSTRACT

A method and apparatus for operating a computer system at the interrupt level. Rather than having a primary task list that is interrupted to service interrupts, all tasks derive from interrupts. To this end, interrupt-time data structures and representations are precomputed and represented. The taxonomy of real time data types is organized. It is preferable to include isochronous media, together with supporting algorithms and heuristics.

4 Claims, 1 Drawing Sheet

REAL TIME ARCHITECTURE FOR COMPUTER SYSTEM

FIELD OF THE INVENTION

This invention is directed toward the field of real time operating systems for computers. In particular, this invention is directed toward an apparatus particularly useful for supporting a real time operating system.

BACKGROUND

There are a great many instances in which it is important to monitor or manipulate data at the time an event is occurring, or to coordinate data that will be used in the future, for example editing audio/video material for future playback.

If an industrial process is running out of control, and, for example, about to overheat and spoil a batch of compound, or if an autopilot in an airplane or many other industrial processes are to be monitored and controlled effectively, it is important that these events be managed in real time, or as close as possible to the actual time of the events of significance.

If a security system is to report the activities of individuals at certain times, it is important to know that some undesirable event is taking place on the loading dock right when it is happening, not some time later.

In making a movie, it is important that the sound and the action be closely synchronized, and that the time for playback is consistent each time.

From a more detailed perspective, within the operation of a computer, it is important that certain information be collected in a timely manner. For example, certain information (a) will be presented once and only once and if missed can never be recovered, or (b) will be presented again and again, as needed, until correctly received but if improperly received will be sent again, thus imposing a time penalty by slowing down transmission of additional information.

In these and in many more instances, it is important to consider the effect of time on the coordination of various events. In particular, many events are best monitored in "real time", and in the ideal this means at the actual time of the actual event (within a small time threshold, preferably on the order of milliseconds or, for some tasks, much much less).

What is "Real Time"? Real time is used in many separate but related senses; each has relevance for defining real time requirements. "Real time" is used:

1. as a synonym for 'low latency', especially with reference to e.g. games in which the fastest possible response by the game to user input from a game controller is required
2. referring to equivalence of elapsed time, as when a recording medium accepts a signal representing a live event and the recording consumes exactly the amount of time the live event did
3. referring to streaming data delivery systems in which the specific order of data (in time) and the rate(s) at which they are delivered are their salient properties
4. to designate hard real time implementations, meaning systems in which a computed result (often a decision to take an action) absolutely must be completed by no later than a stipulated deadline; common in avionics, weaponry, medical and other "mission critical" applications, among others
5. in the sense of clock time, referring to the absolute time expressed in some conventional unit, as in "4:30 PM", or to a range of such times
6. for process control applications, in which the structure, dynamics, and coordination of processes must proceed (often adaptively) according to strict timing and scheduling criteria; often arising in e.g. manufacturing applications, in which motion and amplitudes must be computed to conform to trajectories or models, and often incorporating closed loop feedback and control Variously these differing senses are sometimes referred to as "hard" or "soft" real time. These senses have in common the fact that they differ completely from the prevalent conventional model of computation, in which the only temporal criterion is minimization of execution time, as opposed to fulfillment of schedules and guarantees of timely execution and quality of service.

There are a number of "real time" operating systems currently available. There include products such as Wind River, Lynx, Ready, RT Mach, OS/9 (Microware), RTEMS, with many more being researched and discussed in the engineering literature.

In the normal operation of a computer, each process for the central processor must be scheduled and coordinated with other processes. Prioritizing and scheduling tasks is an important function of the operating system, and significantly related to the architecture of the computer system. The scheduler needs to allocate execution priorities. Most of these are deadlines—such and such task must complete within a specified number of computer cycles, or before a certain clock time.

The processor resources must be spread among tasks in a way which is equitable and efficacious. For well-behaved tasks, the needed resources can be estimated and appropriate resources allocated. The operating system identifies tasks which must be completed to achieve forward progress in one or more programs which are active and schedules those tasks for execution in the processor, perhaps in the form of a task list. The processor takes each task and executes it. Some tasks can be completed in a single processor cycle, others take a small number of cycles, while still others require a considerable number of cycles. Typical examples of such might be, respectively: a simple read; get two numbers from memory, perform a mathematical operation, and restore the result to memory; or transform one line of video data quickly so that it can be output and transformation can begin on the next line. Tasks of arbitrarily large size can execute successfully under such a system.

However, in order for the computer system to be interactive it must accept asynchronous inputs. Such asynchronous events might include input from a computer keyboard ("the next character is an 'a'"), mouse movement, insertion of a floppy disk, the ringing of a telephone, or the presence of a video frame for input. In general, such an asynchronous input needs to be recognized and dealt with within a certain amount of time. While any such input requires a diversion of system resources, when the frequency or size of such events gets large (a frame of video has orders of magnitude more information than a simple keyboard input), this can completely disrupt the earlier allocation of resources within resource constraints. Such a disruption can require a reallocation of processor resources to accommodate asynchronous events and to reschedule the original tasks.

When a single processor is available, the scheduling problem is well understood. Scheduling is commonly based on a rate monotonic scheduling policy. Other scheduling policies have been used, and still others studied academically, but rate monotonic is the most common.

If additional processors are made available, as in a multiprocessor system, scheduling becomes more complex. It turns out that for two processors the scheduling task becomes easier, but for more than two processors, optimized scheduling is very complex and is considered by many to be an intractable problem.

Referring to FIG. 1, the operating system 10, which may be a real time operating system, includes process space 12 which enqueues a number of tasks 14 (1 to n tasks). System hardware 20 communicates with execution space through interrupts 18, RAM 16, and support hardware (not shown). Hardware devices such as disk drives, keyboards, input/output devices and the like are represented generically as hardware 20, which is in communication with operating system 10 through a plurality of interrupts 18 A typical interrupt may be a keypress on a keyboard. The interrupt event is noted in the process space, and an event is dispatched to ascertain the type of interrupt and to collect any associated data. To service the interrupt, execution cycles must be allocated or shared.

Interrupts often are of high priority. No matter the priority, when servicing an interrupt, it becomes necessary to recompute schedules for the initially scheduled tasks. It is important, therefore, that interrupts be serviced without major disruption of existing schedules.

In addition, it is desirable to minimize interrupt latencies. Such latencies arise primarily in the interrupt handler, typically special software or code designed to process the interrupt and respond as needed. Traditionally, programmers seek to minimize the code in an interrupt handler, then relegate recomputation of real time processes to the scheduler in the operating system kernel. In general, it is necessary to reprioritize to accommodate the interrupt.

To view the problem succinctly, processing resources must be divided between forward progress and scheduling. Forward progress includes successful execution of program tasks, such as user input and output to the user, computations on data to prepare for display, e.g. calculation of 3D polygons, and the like. Scheduling includes processing necessary to identify, prioritize and otherwise allocate tasks for forward progress. To accommodate interrupts, scheduling, and other tasks, some 31% of the processing power is reserved for overhead and is not available for forward progress. This overhead is used for scheduling and other support tasks. Unfortunately, most of the time much of this overhead is unused. Under rate monotonic scheduling policies, about 31% of the processing power is reserved for overhead. Reserving unneeded overhead significantly reduces the utilization of the processor.

The scheduling processing portion is itself divided into two primary components—the scheduling algorithm and context switching overhead, accounting for approximately 67 and 33%, respectively, of the scheduling processing resources.

What is needed is a real time operating system than can manage scheduling, deadline processing, and interact with asynchronous inputs without such a massive commitment to largely unused overhead. Preferably such an operating system would be readily scalable to multiprocessor systems.

SUMMARY OF THE INVENTION

This invention provides a method, and apparatus, for operating a computer system at the interrupt level. Rather than having a primary task list that is interrupted to service interrupts, all tasks derive from interrupts.

To this end, interrupt-time data structures and representations are precomputed and represented. The taxonomy of real time data types is organized. It is preferable, if possible, to include isochronous media, together with supporting algorithms and heuristics.

It is convenient to precalculate and represent any needed data structures.

A real time operating system useful in practicing this invention is described in detail in the copending, commonly assigned patent application, entitled "Closed Loop User Interface for Computer System Using Real Time Architecture" and which is incorporated herein by reference in its entirety. This is referred to hereinafter as "Closed Loop Interface".

It is one object of this invention to provide a real time operating system that can service a variety of computing tasks.

This and other objects of the invention will become apparent upon reading the following description. This description is intended to be representational only.

This and other objects and advantages of the invention, as well as the details of an illustrative embodiment, will be more fully understood from the following specification and drawings.

DETAILED DESCRIPTION

Starting with an isochronous view of tasks, it turns out to be rather straightforward to develop a classification (a taxonomy) of tasks which in turn facilitates developing a representation of such tasks that can be used to represent needed data structures. Taking this new perspective, much of the output from a traditionally scheduled task list can be precomputed and represented in this manner.

Viewing the process in somewhat greater detail, the process begins by encoding a representation of isochronous media and real time data types in some form of data structure in a way that can be efficiently accessed and modified at interrupt time. The efficient access at interrupt time is an important element of this new encoding. The encoding and representation make this possible. A preferred data structure includes information about what types of hardware resources are needed, in what quantities, and in what time frames to provide satisfactory response in performing a given task.

Collecting and organizing multiple data structures, these can be classified according to a number of schemes. For example, data structures that require the same hardware resources might be grouped together. Alternatively, data structures that have similar time-for-response requirements might be grouped. Other groupings will be apparent to one skilled in the art. Groupings may be multidimensional so that a given data structure might be a member of several independent, or partially independent, groups.

Isochronous media can coordinate readily with this organization. Data being moved to or from isochronous media can be transported using appropriate data structures, which in turn can be identified according to the taxonomy of those data structures.

Figure 1:
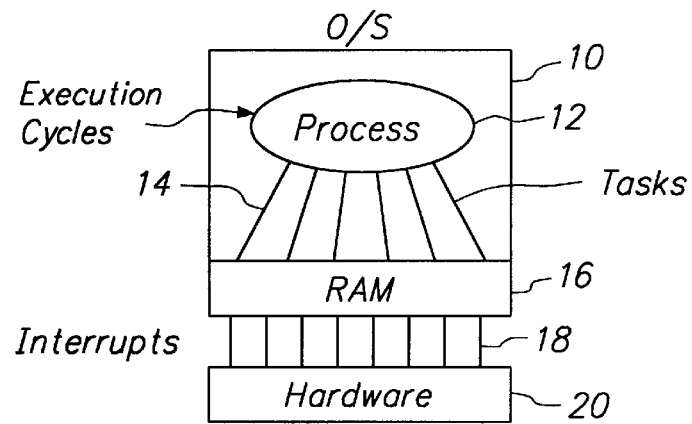
FIG. 1 illustrates process space in a traditional operating system.
Figure 2:
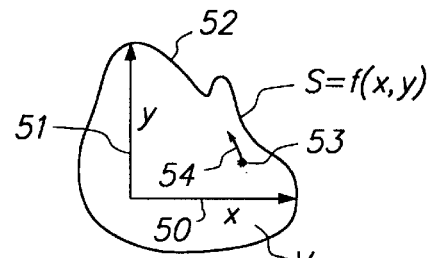
FIG. 2 illustrates a surface in two space representing system resources simultaneously available to two interrupts.

In operation of a system, affiliate each needed hardware interrupt with a dimension of hyperspace. Thus four system interrupt types would call for a four dimensional hypersphere. The volume of this hypersphere can be affiliated with the limit or real time resources in the system. As the processing resource needs of any given interrupt increases (increasing dimension), the "dimensions" available to other interrupts decreases. Referring to FIG. 2, if only two interrupts are active, the resulting hyperspace has only two dimensions, here illustrated as x 50 and y 51. The maximum of system resources available to each of these interrupts is shown by curve 52, a surface S whose shape is a function of x and y (S=f(x, y)). This same principle extends to multiple dimensions, where the resource limit surface $$S=f(x,y,z, \ldots ).$$

The contained n-dimensional volume $V_n$ represents all possible combinations of values of each interrupt dimension that do not exceed available system resources.

The data structures described above define this hypersphere. The representations of these data structures at interrupt time are managed with read/modify/write updates so as to maximize the volume of the hypersphere. The hypersphere can be imagined in three dimensions as a blimp. Pressing against the surface with a finger causes a distortion and decreases the internal volume, more particularly the maximum extent of the three interrupts defining the three dimensional hypersphere, but causes this distortion without going back to the process level. Since the system is managed completely at the interrupt level, this heuristic allows manipulation of the shape and volume of the sphere. According to this volume, additional tasks (interrupts) can be accepted or refused. As each new task is begun, a new dimension to the hypersphere is added, and the allocation in each dimension is adjusted accordingly.

One important element of this perspective is to capture most of the real time properties in the definition of the hypersphere. Interrupts and interrupt servicing are tied to properties of the structure. The structure, or hypersphere, can be managed through use of tables. This overall system allows rapid computation and can be applied as needed to restore the system to near optimality quite rapidly.

Given this structure, how are large processes to be managed? It turns out that if a big process is well designed all of this takes very little time to architect or to run.

The instantaneous state of the system processing resources can be described as a point in this hyperspace. See, for example, point 53 in FIG. 2. Changes in this position define a trajectory as instantaneous services are used or released. See, for example, vector 54 in FIG. 2. To utilize the system at optimal capacity, it is desirable to operate as close as possible to the surface of the hypersphere. As system conditions change, it is desirable to maintain this trajectory along the surface of the hypersphere. The specific location of the system state will change along each dimension, but it is preferable to manage the available dimensions at all times so as to manipulate the surface to coordinate with the trajectory. Thus if extra resources are needed for one task but others are lower priority or perhaps inactive for some period, resources can be shifted from those tasks (the allocated dimension decreased) to the first task (increasing the axis for the first task) thereby moving the hypersphere surface to continue to contain the instantaneous state of the system.

Since the volume of the hypersphere represents all processing resources and each dimension represents the resources used by one particular interrupt, if the system can be maintained to contain the instantaneous state of system resources within the surface of the hypersphere, then no system resource requests will be exceeded. Ideally, resources will be allocated so that the instantaneous state of the system is near the surface at all times, using system resources as fully as possible whenever resources are needed.

The scheduler, then, is tasked with maximizing the volume of the hypersphere (maximizing use of available system processing resources), and to manage the trajectory of the current system state so as to keep it away from the bounding surface, but as close as possible within these constraints. For example, the scheduler may allocate processing time to allow calculation of the next 3D polygon, the next sample of sound, the next packet of a facsimile, EtherNet, or other communication, the next mouse click or the next hard disk address seek.

Some groups of resources can be predicted with reasonable likelihood. For example, when sending or receiving a facsimile, there is a very strong expectation that once the first packet of a page is processed, that there will packets for the rest of that page. Similarly, if a video stream is being managed, the size and frequency of the video frames can be predicted very accurately. Other groups of resources, however, are less predictable. These include, as discussed above, user input or a response from a remote service.

When encoding a representation of a real time data type, or perhaps isochronous media such as an isochronous hard drive, it is preferable to encode to facilitate a "convex hull" or processor resource volume. The likely combination of a given data type with other data types likely to be active at the same time facilitates testing various combinations of representations to maintain this convex surface of the hypersphere. Processes can be characterized in high detail, and it is helpful to limit the number of possible dimensions of this hyperspace and hypersphere.

This concept is quite new for typical computer systems, particularly including personal computer systems, not only for high end publishing, media creation and the like but also for the average consumer, particularly for multimedia creation and playback. However the idea of modeling data or events in hyperspace has been studied in detail in neural net analysis, and in isochronous systems as well.

Returning to the idea of following the surface of a hypersphere, other fields have used conjugate gradient descent productively, particularly in neural net processing. This can be used when assigning resources, perhaps by writing numbers in a small number of locations to redefine the hull of the hypersphere.

Following this concept, if a new interrupt is received and a new dimension defined (or increased to accommodate the interrupt) it is advantageous to identify a local minimum near the current state of the system. Conjugate gradient descent helps with this process. This topic is the subject of much learned discussion in the fields of differential equations and neural nets, as well as game theory and fuzzy logic.

Karmarkar's method is well known in mathematical circles. Briefly, this describes various problems in which solutions involve finding the most efficient path between two points on a hypersphere. The Karmarkar method itself is computationally intensive but if set up according to this invention, if appropriate data structures are precalculated, these solutions may be quite tractable using the new method.

This new method is very useful in multiprocessor systems as well. Two or more processors might be used asymmetrically, with one computing volumes and trajectories for system resources, and the other one or more dedicated to continuing to provide forward progress.

Figure 3:
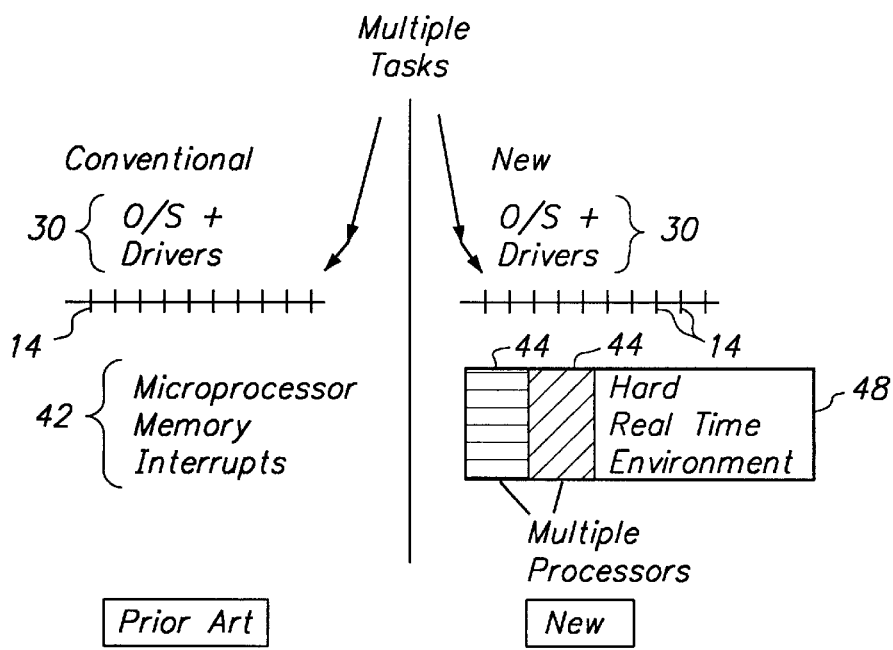
FIG. 3 illustrates allocation of resources in a prior art system and in a system of the new invention.

Referring to FIG. 3, in the prior art, the operating system and drivers 30 were connected (communicated with) the microprocessor, memory and interrupts 42 through multiple tasks 14. Using the architecture of this invention, operating system and drivers 30 are still connected via multiple tasks 14 but now these may be connected directly to a hard, real time environment processor 48 which, as discussed above, manages tasks as interrupts, or may connected directly to one or more processors 44 which are dedicated to forward progress in applications. To the extent the real time environment processor 48 from time to time has extra resources available, those resources will be dedicated to forward progress on other tasks 14.

A fundamental paradigm shift in the model of computation is implied by the emphasis on characterization of the system's total interrupt environment. The conventional or traditional model of computation is minimization of all latencies to reduce elapsed time. The model here is everywhere directed at latency characterization rather than minimization per se. Some tasks may not need low latency response and thus may be scheduled with more flexibility than others.

Under this paradigm, many practices which would be anathema to either a traditional O/S designer or to a traditional real time kernel designer are in fact preferable in a scheme which seeks to be able to define deterministic limits on the variances (and other statistical measures such as the kurtosis and heteroscedasticity) and ranges of latencies, as opposed merely to minimizing or prioritizing them.

A fundamental property of a system based on this paradigm is the granularity with which pending I/O functions may be preempted and reordered. Conventional systems allow kernel preemption in some cases (for example NuKernel), but do not define explicit low level granularity for the preemption of I/O processes as a complement to the kernel preemptability. This ability to reorder and preempt even the deepest levels of all I/O processes violates the structural assumptions of conventional O/S and real time kernel designs, and is a necessary condition for attaining the optimality sought by the "hyperspherical volume" maximization heuristic of this invention.

A third implication of the approach is its impact on the design of storage layout for real time sourcing and sinking (more or less equivalent to reading and writing). Because latencies are explicitly characterized and governed at an arbitrarily low granularity, it becomes reasonable to model a space-time decomposition of media with large latencies such that no access pattern of a specified type incurs any latency exceeding some threshold. In this case file systems and repositories can be flexibly modeled at a higher level to meet arbitrary quality of service and throughput criteria, because the modeled latency characteristics have been expressed in the data structures which govern the system's global optimization.

The coupling of optimum-seeking heuristics (the "hypersurface" approach) with everywhere-characterized latency gives rise to a new set of rules for protocols operating over these media. These protocols have properties which depend on the universal latency characterization and control mechanisms in the architecture which allow for inexpensive distribution over wide areas of the quality of service and scalability properties of the real time architecture.

The process structure in the system would support the protocol and other attached external sources of asynchronous interruption through a three-stage sequence whereby new events and tasks can be accommodated in the "inner-sanctum", the part of the system in which latency and process are modeled to produce guarantees (or, equivalently, deterministic degradation). Stage 1 is contingent admission, and accumulation of characterization properties. Stage 2 is admission on a best efforts basis, but without certification of guarantees. Stage 3 is admission with guarantees, meaning that the deterministic properties of the applying processes have been vetted and compared with the prevailing resource model, and found to be acceptable. Failure at any of these stages could then (through suitable APIs) invoke any applicable graceful degradation mechanisms.

Finally, there are a number of specific details implied in this architecture bearing on the design of the following hardware elements of true realtime systems: the DMA controller, the programmable interrupt controller, the memory controller, and the multi-processing interconnect, especially insofar as these are used in conjunction with isochronous interconnect media. Each of these hardware elements must be designed to accommodate and interact with the system processor of the invention. This can be achieved fairly directly by mapping an interface between each controller and the new system which to the system appears simply as another interrupt, and to the controller appears as an appropriate master or slave, issuing commands more or less typical of typical commands from conventional systems.

A general description of the device and method of using the present invention as well as a preferred embodiment of the present invention has been set forth above. One skilled in the art will recognize and be able to practice many changes in many aspects of the device and method described above, including variations which fall within the teachings of this invention. The spirit and scope of the invention should be limited only as set forth in the claims which follow.

What is claimed is:

1. A system of providing computer processing resources, comprising:

on a computer system with computer processing resources, scheduling processing tasks on an interrupt-only basis, pre-assigning a first planned task as a first class of interrupt, pre-assigning a second planned task as a second class of interrupt, executing a computer program including said first planned task and said second planned task, when said first planned task is to be performed, invoking said first class of interrupt and when said second planned task is to be performed, invoking said second class of interrupt, whereby essentially every task on said computer is invoked as a class of interrupt.

2. The system of claim 1 further comprising characterizing said first and said second class of interrupt respectively as a first and a second orthogonal dimension in two dimensional space, classifying available system resources for said first class of interrupts in terms of units of first system processing capability and quantifying that capability along said first dimension, classifying available system resources for said second class of interrupts in terms of units of second system processing capability and quantifying that capability along said second dimension, determining a two-dimensional surface defined as a function of said first and second system processing capabilities, taken together, to utilize all available system resources.

3. The system of claim 1 further comprising pre-assigning a first plurality of planned tasks as a second plurality of classes of interrupts such that each planned task corresponds to a specific class of interrupt, executing one or more computer programs which include tasks of said first plurality of planned tasks, when a selected one of said planned tasks is to be performed, invoking the corresponding specific one of said plurality of classes of interrupts, and running said selected one of said planned tasks as said specific one of said classes of interrupts.

4. The system of claim 2 further comprising characterizing said second plurality of classes of interrupts as a third plurality of orthogonal dimensions in an n-dimensional hyperspace, such that each class of interrupts corresponds to a specific orthogonal dimension, classifying available system resources for a fourth plurality of said classes of interrupts, each in terms of units of system processing capability and quantifying that capability along said specific dimension for each of said classes of interrupts of said fourth plurality, determining an n-dimensional surface defined as a function of said system processing capabilities, taken together, to utilize all available system resources.

* * * * *